(12) United States Patent
Ibdah (10) Patent No.: US 8,773,374 B2
(45) Date of Patent: Jul. 8, 2014

(54) IDENTIFICATION OF TOUCH POINT ON TOUCH SCREEN DEVICE

(75) Inventor: Abdallah Ibdah, Ottawa (CA)

(73) Assignee: BlackBerry Limited, Waterloo, Ontario (CA)

( * ) Notice: Subject to any disclaimer, the term of this patent is extended or adjusted under 35 U.S.C. 154(b) by 445 days.

(21) Appl. No.: 13/107,148

(22) Filed: May 13, 2011

(65) Prior Publication Data

US 2012/0287056 A1 Nov. 15, 2012

(51) Int. Cl.
*G06F 3/041* (2006.01)

(52) U.S. Cl.
USPC .................. 345/173; 345/156; 178/18.01

(58) Field of Classification Search
USPC .......... 345/156–179; 178/18.01, 19.01, 20.01
See application file for complete search history.

(56) References Cited

U.S. PATENT DOCUMENTS

| | | | |
|---|---|---|---|
| 7,884,806 B2 * | 2/2011 | Trent, Jr. ..................... | 345/173 |
| 8,237,665 B2 * | 8/2012 | Duncan et al. ................ | 345/173 |
| 8,259,240 B2 * | 9/2012 | Han ............................. | 349/12 |
| 8,279,180 B2 * | 10/2012 | Hotelling et al. ............ | 345/173 |
| 8,356,250 B2 * | 1/2013 | Ko ................................ | 715/727 |
| 2006/0022956 A1 * | 2/2006 | Lengeling et al. ........... | 345/173 |
| 2006/0227116 A1 | 10/2006 | Zotov et al. | |
| 2007/0236478 A1 * | 10/2007 | Geaghan et al. ............. | 345/173 |
| 2009/0289913 A1 * | 11/2009 | Chang et al. ................. | 345/173 |
| 2010/0259494 A1 * | 10/2010 | Kii ............................... | 345/173 |
| 2010/0315366 A1 | 12/2010 | Lee et al. | |
| 2011/0007004 A1 | 1/2011 | Huang et al. | |
| 2011/0018822 A1 * | 1/2011 | Lin et al. ...................... | 345/173 |
| 2011/0069029 A1 * | 3/2011 | Ryu et al. ..................... | 345/173 |
| 2011/0102464 A1 * | 5/2011 | Godavari ...................... | 345/650 |
| 2011/0115730 A1 * | 5/2011 | Kim et al. .................... | 345/173 |

FOREIGN PATENT DOCUMENTS

| | | |
|---|---|---|
| EP | 1914623 A1 | 4/2008 |
| WO | 2007014064 A2 | 2/2007 |
| WO | 2009098575 A2 | 8/2009 |
| WO | 2009142871 A2 | 11/2009 |

OTHER PUBLICATIONS

European Patent Office, Extended European Search Report, Application No. 11167536.9, Sep. 15, 2011.

* cited by examiner

*Primary Examiner* — William Boddie
*Assistant Examiner* — Mansour M Said
(74) *Attorney, Agent, or Firm* — Quarles & Brady LLP (57) ABSTRACT

A system and method of determining a target touch point on a touch screen is presented. A touch down event at a first time and a first location on a touch screen is detected and a touch up event at a second time and a second location on the touch screen is detected. A mode of operation using at least one of the touch down event and the touch up event is characterized. A target touch point is determined using at least one of the touch down event, the touch up event, and the characterization of the mode of operation.

8 Claims, 9 Drawing Sheets

IDENTIFICATION OF TOUCH POINT ON TOUCH SCREEN DEVICE

BACKGROUND OF THE INVENTION

Touch screens are increasingly being implemented in many devices in which it is desirable to combine the display and controls of a user interface. For example, in mobile devices, which are compact by nature, there has been a movement to replace traditional controls such as buttons or wheels with touch screen interfaces. By incorporating the controls into the touch screen, there is more flexibility in the design of the user interface and a larger portion of the device can be occupied by a viewable display.

Even with the enlarged displays on some mobile devices, it can be difficult for the device to accurately identify the user's intended touch point on the touch screen. In some cases, when a user is tapping quickly on the screen, such as when typing, during a touch the user's finger slides across the screen by some distance making the intended target difficult to detect. If the device is to presume that either the initial contact point or the release point is the target touch location, that may be incorrect as the actual target point may be somewhere between the two.

In other circumstances, the user may intentionally drag a finger across the screen. If, for example, the initially touches the screen at a first location, but intended to touch at a second location, the user may correct the touch point by dragging a finger across the screen towards the intended touch point. In that case, if the device presumes that the initial touch point or an intermediate point is the target touch point, the device may again inaccurately identify the target touch point.

As such, the identification of a user's intended target touch point on a touch screen is sometimes affected by the user's behavior while using the touch screen device.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

The present disclosure relates generally to detection of a touch point on a touch screen device. More specifically, the present invention is directed to analyzing user behavior to determine a target touch point on a touch screen device.

In one implementation, the present invention is a method of determining a target touch point on a touch screen. The method includes detecting a touch down event at a first time and a first location on a touch screen, and detecting a touch up event at a second time and a second location on the touch screen. The method includes characterizing a mode of operation using at least one of the touch down event and the touch up event, and determining a target touch point using at least one of the touch down event, the touch up event, and the characterization of the mode of operation.

In another implementation, the present invention is a method of determining a target touch point on a touch screen. The method includes detecting a touch down event at a first time and a first location on a touch screen, and detecting a touch up event at a second time and a second location on the touch screen. The method includes comparing the first time and the second time to determine a touch duration for characterizing an operation of the touch screen, and determining a target touch point using the touch down event location, the touch up event location, and the touch duration.

In another implementation, the present invention is a user equipment. The user equipment includes a touch screen, and a sensor coupled to the touch screen. The sensor is configured to detect a touch down event at a first time and a first location on the touch screen, and detect a touch up event at a second time and a second location on the touch screen. The user equipment includes a processor coupled to the sensor and in communication with a memory. The memory stores instructions which, when executed by the processor cause the processor to identify a mode of operation by analyzing the touch down event and the touch up event, and determine a target touch point using at least one of the touch down event, the touch up event, and the mode of operation.

To the accomplishment of the foregoing and related ends, the disclosure, then, comprises the features hereinafter fully described. The following description and the annexed drawings set forth in detail certain illustrative aspects of the disclosure. However, these aspects are indicative of but a few of the various ways in which the principles of the disclosure can be employed. Other aspects, advantages and novel features of the disclosure will become apparent from the following detailed description of the disclosure when considered in conjunction with the drawings.

The various aspects of the subject disclosure are now described with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents, and alternatives falling within the scope of the claimed subject matter.

Figure 4:
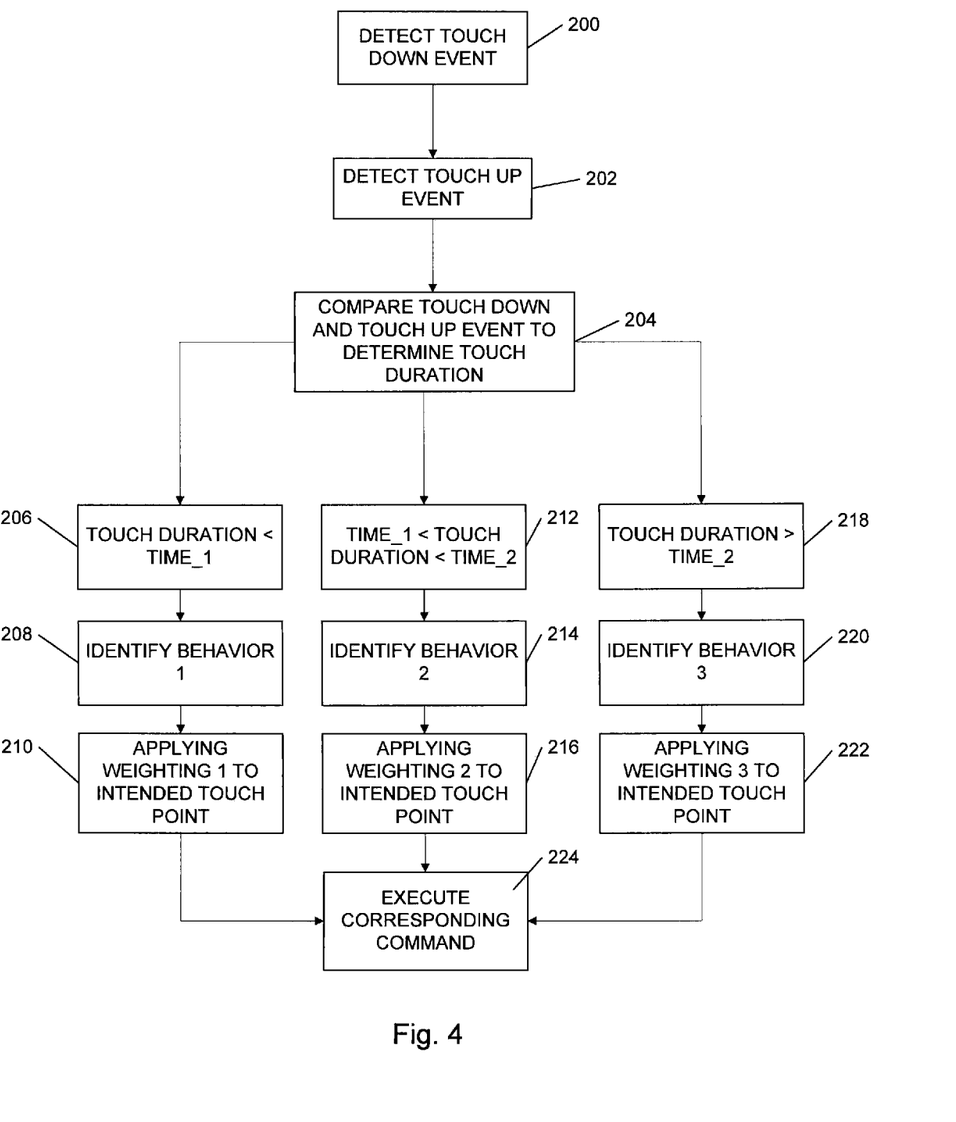
FIG. 4 is a flowchart illustrating an example method for identifying a user's target touch point using a touch down event and a touch up event to characterize user behavior.
Figure 6:
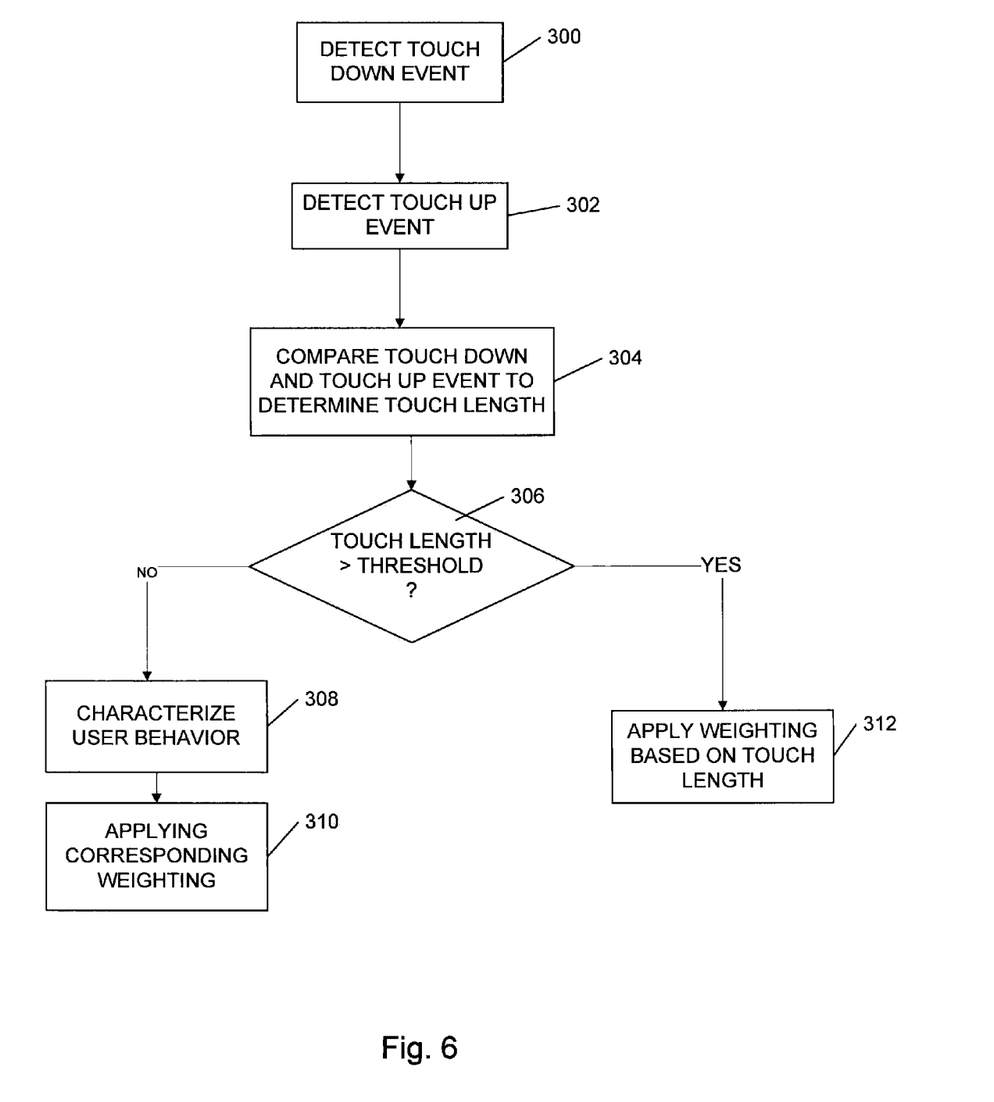
FIG. 6 is a flowchart showing an alternative method of the present system, wherein a touch path distance threshold is used to further determine the position of the target touch point.
Figure 7:
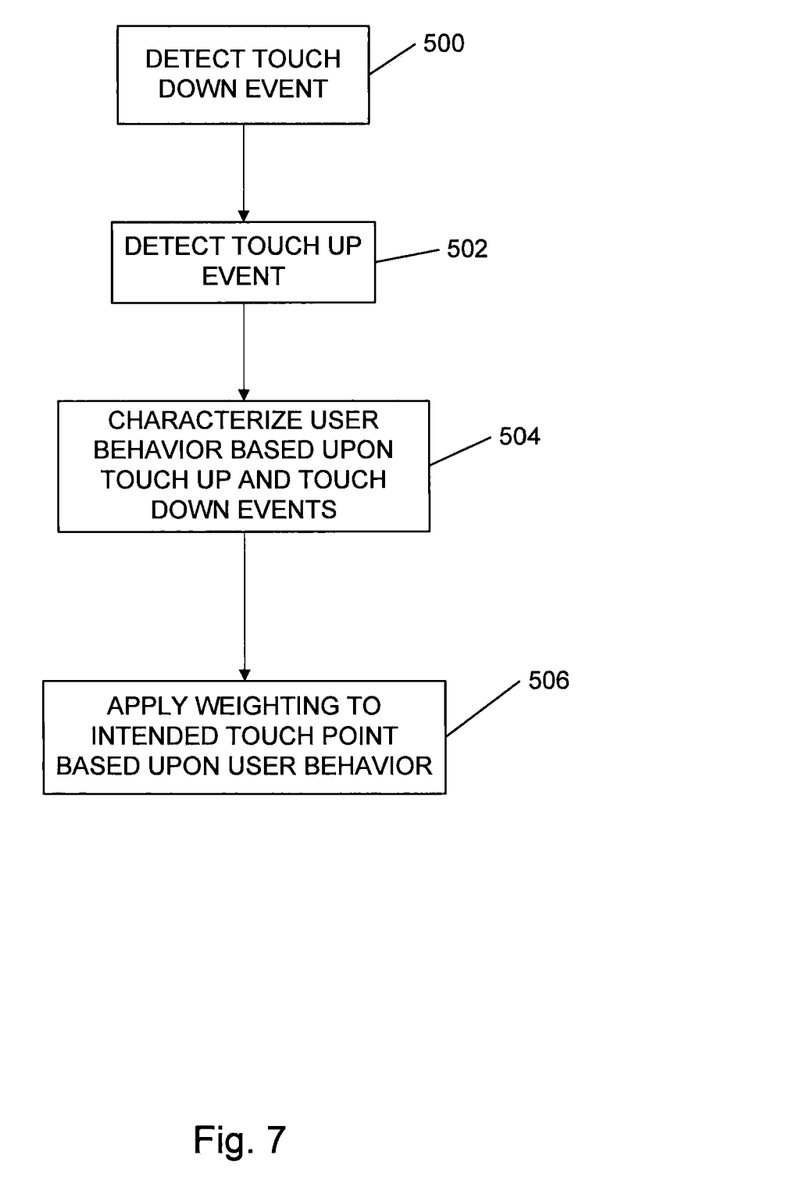
FIG. 7 is a flowchart illustrating an implementation of the present system.

The schematic flow chart diagrams included in the present disclosure are generally set forth as logical flow-chart diagrams (e.g., FIGS. 4, 6, and 7). As such, the depicted order and labeled steps are indicative of one embodiment of the presented method. Other steps and methods may be implemented that are equivalent in function, logic, or effect to one or more steps, or portions thereof, of the illustrated method. Additionally, the format and symbols employed are provided to explain the logical steps of the method and do not limit the scope of the method. Additionally, the order in which particular steps of the present method occur may or may not strictly adhere to the order of the corresponding steps shown.

As used herein, the terms "component," "system", "module" and the like are intended to refer to a computer-related entity, either hardware, a combination of hardware and software, software, or software in execution. For example, a component may be, but is not limited to being, a process running on a processor, a processor, an object, an executable, a thread of execution, a program, a computer, or any combination thereof. By way of illustration, both an application running on a computer and the computer can be a component. One or more components may reside within a process or thread of execution and a component may be localized on one computer or distributed between two or more computers.

The word "exemplary" is used herein to mean serving as an example, instance, or illustration. Any aspect or design described herein as "exemplary" is not necessarily to be construed as preferred or advantageous over other aspects or designs.

Furthermore, the disclosed subject matter may be implemented as a system, method, apparatus, or article of manufacture using standard programming and/or engineering techniques to produce software, firmware, hardware, or any combination thereof to control a computer or processor-based device to implement aspects detailed herein. The term "article of manufacture" (or alternatively, "computer program product") as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Of course, those skilled in the art will recognize many modifications may be made to this configuration without departing from the scope of the claimed subject matter.

Figure 1:
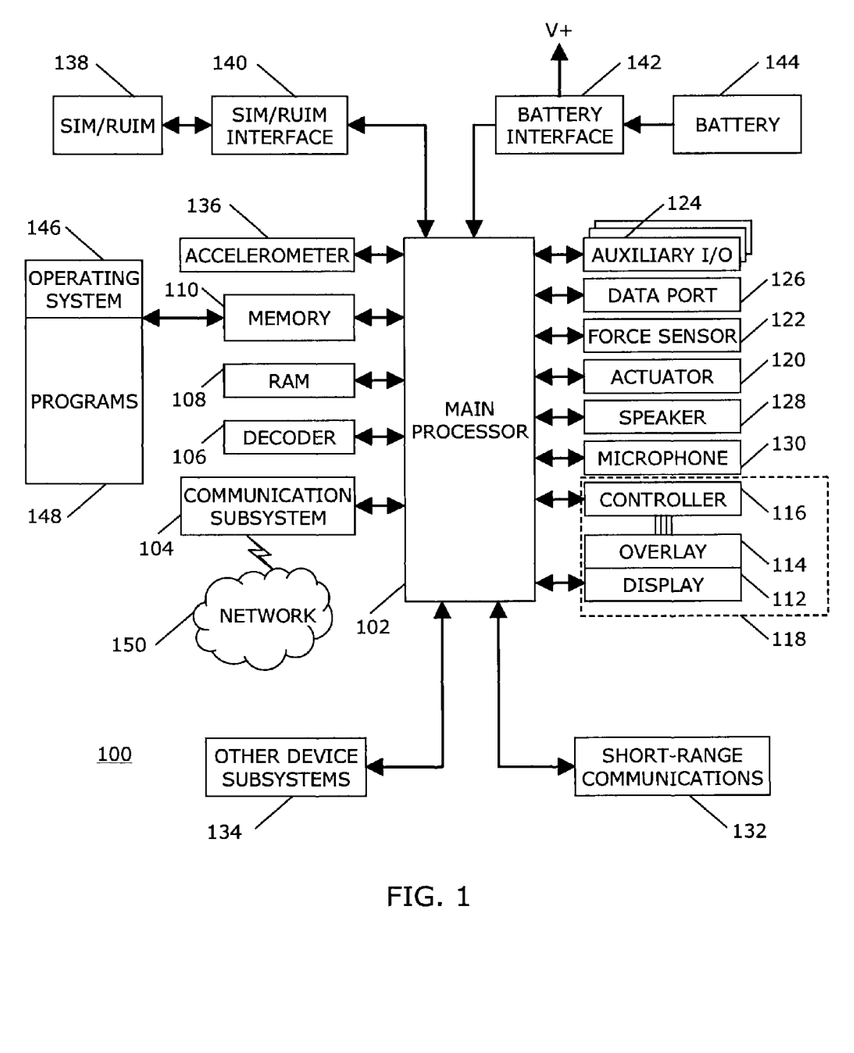
FIG. 1 is a front plan view of a touch device having a user interface.

A block diagram of an example of an embodiment of portable electronic device 100 is shown in FIG. 1. Portable electronic device 100 includes multiple components such as processor 102 that control the overall operation of portable electronic device 100. Communication functions, including data and voice communications, are performed through communication subsystem 104. Data received by portable electronic device 100, if required, can be decompressed and decrypted by decoder 106. Communication subsystem 104 is configured to receive messages via and send messages through wireless network 150. Wireless network 150 may be any type of wireless network, including, but not limited to, data-centric wireless networks, voice-centric wireless networks, and dual-mode networks that support both voice and data communications over the same physical base stations. Portable electronic device 100 can be a battery-powered device and may include battery interface 142 for receiving one or more rechargeable batteries 144 or other portable energy supply devices.

Processor 102 also interacts with additional subsystems such as a Random Access Memory (RAM) 108, memory 110, display 112 with touch-sensitive overlay 114 connected to electronic controller 116 that together comprise touch-sensitive display or touch screen display 118, actuator 120, one or more force sensors 122, auxiliary input/output (I/O) subsystem 124, data port 126, speaker 128, microphone 130, short-range communications 132 and other device subsystems 134.

User-interaction with the graphical user interface of personal electronic device 100 can be performed through touch-sensitive overlay 114. Information, such as text, characters, symbols, images, icons, and other items that may be displayed on a portable electronic device, can be displayed or rendered on touch-sensitive display 118 via processor 102.

When a touch event is detected on touch-sensitive display 118, x and y coordinates of the touch event are determined, and the location of the touch may be associated with information displayed via a graphical user interface. Touch events can include touch down events, such as when a user initially presses a finger or other object (e.g., a stylus, or pen) against a surface of touch screen display 118, and touch up events, such a when a user lifts a finger or other object off a surface of touch screen 118. Each time a user interacts with touch screen display 118 (i.e., at each 'touch') there is both a touch down event and a touch up event.

Further information describing a detected touch, such as a contact area of the touch event, the pressure or force with which the touch is imparted on the touch screen display 118, or a touch path describing a number of contact points or continuous path between a touch down event and a touch up event, may be collected and provided to processor 102. Here, references to the contact area and the size of the contact area refer to the contact area and size of the contact area as determined or detected by the portable electronic device, and may not precisely reflect the actual area physically contacted by a contact member. A touch can comprise one or more various actions, including, but not limited to, contact of or beyond a given pressure or other characteristic, contact including movement, contact over a period of time, and various combinations thereof.

Processor 102 may also interact with an accelerometer 136 as shown in FIG. 1. Accelerometer 136 may include a cantilever beam with a proof mass and suitable deflection sensing circuitry. Accelerometer 136 can be used for detecting direction of gravitational forces or gravity-induced reaction forces acting on portable device 100.

To identify a subscriber for network access according to the present disclosure, portable electronic device 100 can use Subscriber Identity Module or Removable User Identity Module (SIM/RUIM) card 138 inserted into SIM/RUIM interface 140 for communication with a network such as wireless network 150. Alternatively, user identification information may be programmed into memory 110 or retrieved from another data storage location.

Portable electronic device 100 also includes operating system 146 and software components 148 that are executed by processor 102 and are typically stored in a persistent, updatable storage medium such as memory 110 (see FIG. 1). Additional applications may be loaded onto portable electronic device 100 through wireless network 150, auxiliary I/O subsystem 124, data port 126, short-range communications subsystem 132, or any other suitable device subsystem 134.

In use, a received signal such as a text message, e-mail message, or web page download is processed by communication subsystem 104 and input to processor 102. Processor 102 processes the received signal for output to display 112 or, alternatively, to auxiliary I/O subsystem 124. A subscriber may also compose data items, such as e-mail messages, for example, which may be transmitted over wireless network 150 through communication subsystem 104. For voice communications, the overall operation of portable electronic device 100 is similar. Speaker 128 outputs audible information converted from electrical signals, and microphone 130 converts audible information into electrical signals for processing.

Figure 2:
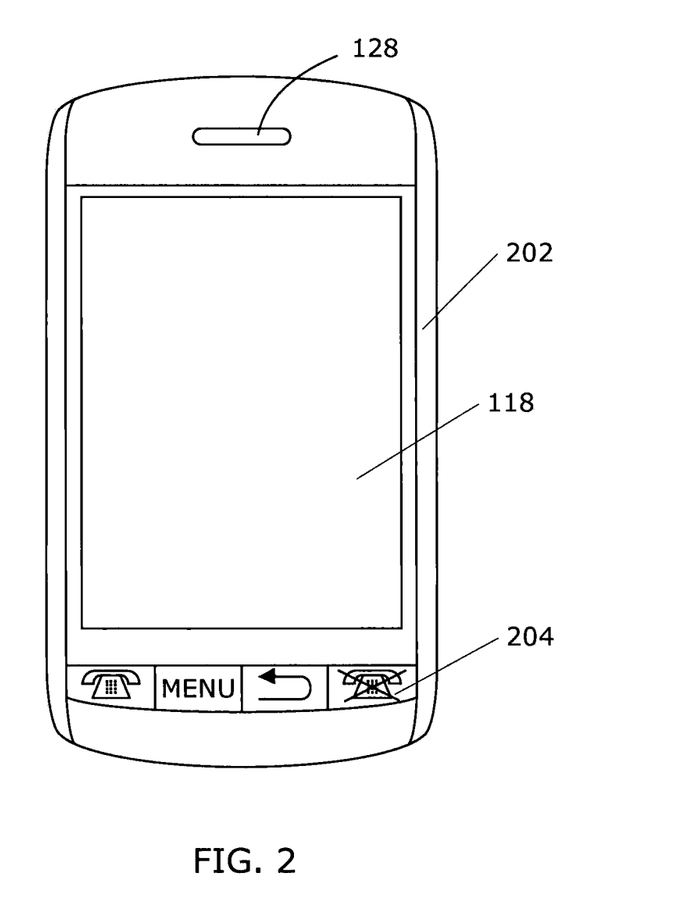
FIG. 2 is a view of the touch device of FIG. 1 showing the touch screen display.

A front view of portable electronic device 100 is shown in FIG. 2. Portable electronic device 100 includes housing 202 that supports touch screen display 118, mechanical or displayed buttons 204, and speaker 128.

Portable electronic device 100 includes one or more sensors for detecting a touch by a contact member, such as a finger, thumb, stylus, or other suitable object on touch screen display 118. The sensor(s) may be located below the touch-sensitive overlay 114 (shown on FIG. 1), around a periphery of touch screen display 118, and/or beneath a tray that supports touch screen display 118 in the form of piezoelectric sensors. Alternatively, the sensor(s) may be located in other places in portable electronic device 100 or may be other types of sensor(s) depending on the particular type of touch-sensitive technology. Portable electronic device 100 can use any appropriate touch-sensitive technology and its associated sensor(s) including resistive, surface acoustic wave, capacitive, infrared, strain gauge, optical imaging, dispersive signal technology, acoustic pulse recognition, and so forth.

Each time the user's finger touches touch screen display 118, the sensor(s) detect a touch down event and a touch up event and may record associated touch data (e.g., location and time). In some cases, a size of the contact area is also determined and recorded. The manner of determining the location of the contact area may be direct when touch screen display 118 is capable of detecting a contact area and/or generating a signal or signals that processor 102 may use to determine a contact location. Alternatively, the location of the contact area may be determined using less direct or inferential means when direct measurement of a contact location may not be available.

In the example of portable electronic device 100 using capacitive technology, multiple layers, including electrically-separated driving electrodes and sensing electrodes, are oriented in directions perpendicular to one another to form a grid. The drive electrodes carry a current and cross over the sensing electrodes. When a finger or other suitable contact member locally disrupts the capacitance over adjacent sensing electrodes, a touch is detected. By measuring and comparing the signals generated by the electrodes as a result of the change in capacitance, processor 102 establishes coordinates and/or contact areas for a touch event. Other technologies may be used to detect and/or measure/estimate a contact location.

Each touch event (e.g., touch up and touch down events) is associated with a pair of x-y location coordinates identifying a position on touch screen display 118. Because the force applied by a non-moving contact member is rarely completely static, e.g., because a user may slide their finger while making contact, a single touch may be associated with a plurality of touch events having locations that vary over a period of time, including, in some cases, a relatively short period of time.

Portable electronic device 100 can incorporate profile management for multiple users such that when the user changes, the calibration of touch screen display 118 is adjusted based upon that user's preferences. In some cases, the changing of a user is automatically detected by device 100 by identifying a change in touch patterns or through other identifiable touch characteristics collected during touch operation of device 100, such as a contact area of a touch. The user profile may also or alternatively be manually selected by the user.

Touch screen display 118 is configured to display text, characters, symbols, images, icons, and other items to allow a user to interact with portable electronic device 100. By touching touch screen display 118 at the location at which a particular icon or symbol is displayed, the user can communicate commands to device 100 instructing device 100 to take particular actions such as executing programs, entering letters or numbers through a keyboard, or controlling a character in a game.

The way in which the user enters input through touch screen display 118 can vary based upon the user's method of using portable electronic device 100. In some cases, the input will be relatively sparse and slow, such as when using the touch screen to take a picture, or browse a website. In other cases, though, the user may input data through the touch screen display 118 rapidly, such as when typing an email or text message quickly, manipulating controls in a game, or simply when entering input to device 100 quickly. When touching rapidly on touch screen display 118, the user's finger can slide across the surface of touch screen display 118 by some distance. Alternatively, when touching at a slower pace, the user may drag their finger across the touch sensitive display as part of a touch. In either case, for each touch, the touch down event and the touch up event will be detected in different locations. This can make it difficult to identify the user's target touch point as the user's target touch point could be the touch down or touch up location, or at a location between the touch down and touch up events.

When the user's finger slides across the touch screen during a touch, resulting in touch down and touch up events that are separated by some distance, it is possible to analyze the user's behavior while using the touch screen device to estimate the user's target touch point. By analyzing the duration of a particular touch event, for example, it is possible to bias or weight the identified touch point towards the touch down event, touch up event, or a midpoint defined on a path between the touch down and touch up events to more accurately identify the target touch point and to compensate for the user's finger sliding across the touch screen.

When a user is typing quickly, for example, the touch down event may be closer to the user's target touch point, whereas the touch up event is located away from the user's target touch point and results primarily from the user's finger sliding across the touch screen. In other cases, where the user is touching on the touch screen more deliberately, it can be more accurate to locate the target touch point away from the touch down event and towards the touch up event. For example, the user may initially touch the touch screen at an incorrect location due to missing the user's target touch point (e.g., by touching the wrong key or icon on the touch screen). After realizing that the user has missed his or her intended touch point, the user will then slide their finger across the touch screen towards the target touch point. In that case, the touch up event location may be relatively accurate, while the touch down event location is incorrect. As such, in that case, the target touch point can be weighted towards the touch up event location.

In the present disclosure, device 100 is configured to analyze user behavior to generate an appropriate weighting for adjusting the position of a target touch point based upon the user's behavior to more accurately approximate the user's intended touch point. In some implementations, portable electronic device 100 implements preliminary touch detection algorithms to generate an initial estimate of the user's target touch point based upon the touch down and touch up events. The estimate may be rudimentary. For example, the preliminary position may always be equal to the touch down event location, the touch up event location, or a midpoint. Having created an initial guess, portable electronic device 100 can then use the system and method of the present disclosure to determine a weighting based upon user behavior. The weighting can then be used to modify the initial guess position based upon the user's behavior towards a more likely target touch point. Alternatively, in some cases the weightings of the present disclosure may be sufficient to determine the target touch point, without using or modifying any preliminary estimate of the portable electronic device 100. In that case, the weightings can be used to specifically locate a target touch point based upon, in part, the user's behavior.

Figure 3A:
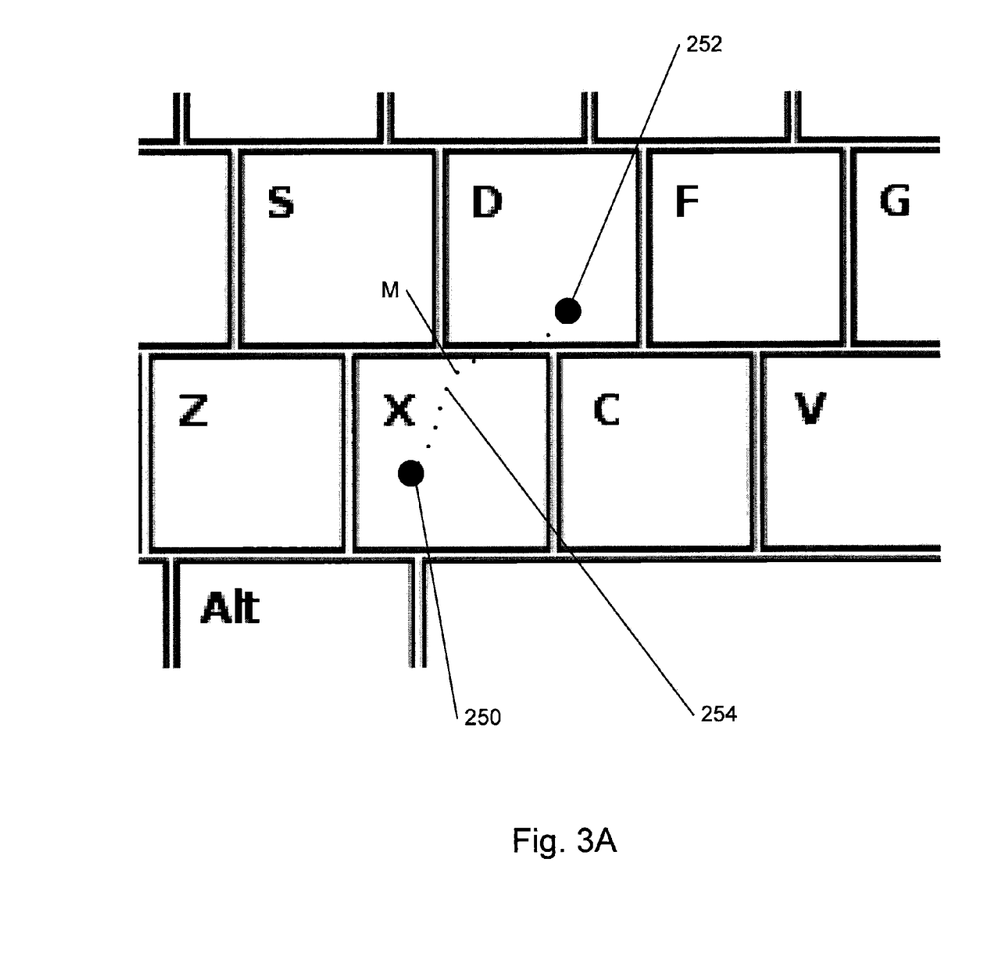
FIGS. 3A and 3B show example keyboards that may be displayed on a touch screen display of a portable electronic device for receiving user input.
Figure 3B:
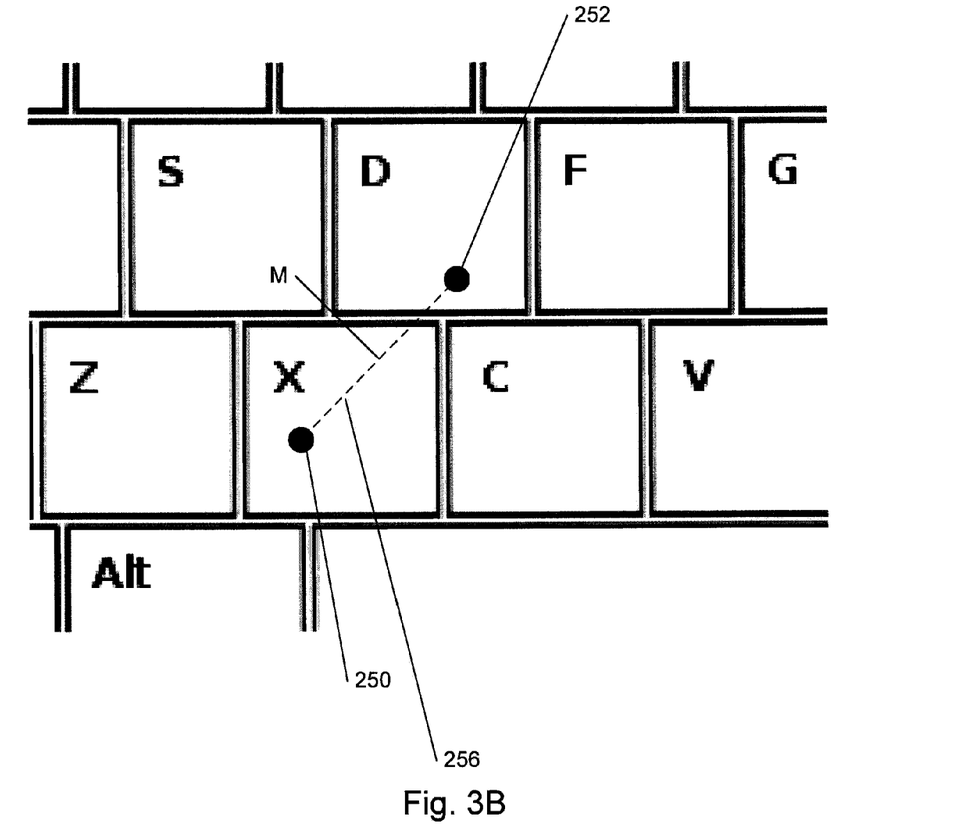

FIGS. 3A and 3B show example keyboards that may be displayed on touch screen display 118 of portable electronic device 100 for receiving user input. The keyboard includes a number of keys. Depending upon which key is touched by the user, portable electronic device 100 can execute any appropriate operation.

As shown on FIG. 3A, a user has touched the screen resulting in device 100 detecting touch down event 250 and touch up event 252. As shown in FIG. 3A, while executing the touch, the user's finger slid across the surface of touch screen display 118 resulting in some displacement between touch down event 250 and touch up event 252. For each event, device 100 stores the event's location on touch screen display 118 and the event's time (or, alternatively, measures a time duration between detecting the touch down and touch up events).

FIG. 3A also shows path 254 taken by the user's finger between touch down event 250 and touch up event 254. Depending upon the implementation of device 100, device 100 may or may not record data describing path 254. Device 100 may, for example, record the location of a number of distinct touch points detected between touch down event 250 and touch up event 252 (e.g., at the location of each dot shown in path 254 of FIG. 3A) recorded at a particular sample frequency.

Alternatively, as shown in FIG. 3B, rather than record a path taken by a user's finger between touch down event 250 and touch up event 252, after detecting both the touch up and touch down event, device 100 defines line 256 passing between each event as the touch path. In that case, when applying the weighting to identify the user's target touch point, device 100 is configured to place the target touch point at some point along line 256 (that may include either of touch down event location 250 and touch up event location 252).

FIG. 4 is a flowchart illustrating an example method for identifying a user's target touch point using the touch down event and the touch up event to characterize user behavior. The method may be executed by device 100, though in other implementations, other touch screen devices or their components can use the present method to determine a target touch point.

In step 200, a touch down event is detected and a location of the touch down event is stored in a memory (e.g., memory 110 of FIG. 1). A time stamp for the touch down event is also stored (or, alternatively, a timer is started that runs until a corresponding touch up event is detected). In step 202, a corresponding touch up event is detected. The location of the touch up event and a time of the touch up event are stored. In implementations where a timer was started in step 200, the timer is stopped in step 202.

In step 204, device 100 determines a duration of the touch event by comparing the time of the touch down event (stored in step 200) and the time of the touch up event (stored in step 202). Alternatively, in implementations where a timer was used, the device reads the value of the timer.

Device 100 can then use the touch duration to characterize a behavior of the user and, using that behavior, weight the target touch point at a position between (and possibly including) the touch down event and the touch up event.

In step 206, if the touch duration is less than time_1 (e.g., 100 milliseconds), device 100 characterizes in step 208 the user's behavior as a first behavior 1 (e.g., typing quickly). Then, using that behavior, in step 210 device 100 weights the position of the target touch point accordingly. In one implementation, weighting 1 causes the target touch point to be located at the touch down event location. Depending upon the implementation, though, weighting 1 can cause the target touch point to be located at any appropriate position along a path between the touch down event and the touch up event (e.g., at a point between touch down event 250 and midpoint M shown on FIGS. 3A and 3B). In implementations where device 100 records a touch path (see, for example, touch path 254 of FIG. 3A), either as a continuous line or a number of intermediary points, the target touch point, after applying the weighting, can be positioned at any location along that touch path. In other implementations, though, a straight line (e.g., line 256 on FIG. 3B) is defined that begins on the touch down event location, and ends on the touch up event location, and the target touch point is positioned on that line.

In step 212, if the touch duration is between time_1 and time_2 (e.g., 250 milliseconds), device 100 characterizes in step 214 the user's behavior as a second behavior 2 (e.g., typing at a moderate pace). Then, using that behavior, in step 216 device 100 weights the position of the target touch point accordingly. In one implementation, weighting 2 causes the target touch point to be located at a mid-point (e.g., point M on FIGS. 3A and 3B) between the touch down and touch up event locations. Depending upon the implementation, though, weighting 2 can cause the target touch point to be located at any appropriate position along a path between the touch down event and the touch up event. In implementations where device 100 records a touch path (see, for example, touch path 254 of FIG. 3A), either as a continuous line or a number of intermediary points, the target touch point, after applying the weighting, can be located upon that touch path. In other implementations, though, a straight line (e.g., line 256 on FIG. 3B) is defined that begins on the touch down event location, and ends on the touch up event location, and the target touch point is positioned on that line.

In step 218, if the touch duration is greater than time_2 (e.g., 250 milliseconds), device 100 characterizes in step 220 the user's behavior as a third behavior 3 (e.g., typing at a slow pace). Then, using that behavior, in step 222 device 100 weights the target touch point accordingly. In one implementation, weighting 3 causes the target touch point to be located at the touch up event location. Depending upon the implementation, though, weighting 3 can cause the target touch point to be located at any appropriate position along a path between the touch down event and the touch up event. In implementations where device 100 records a touch path (see, for example, touch path 254 of FIG. 3A), either as a continuous line or a number of intermediary points, the target touch point, after applying the weighting, can be located upon that touch path. In other implementations, though, a straight line (e.g., line 256 on FIG. 3B) is defined that begins on the touch down event location, and ends on the touch up event location, and the target touch point is positioned on that line.

After weighting the position of the target touch point, in step 224 device 100 executes a command or function that corresponds to the location of the target touch point. For example, when the user is typing on a keyboard, device 100 uses the weighted target touch point to identify a particular key on the keyboard, and then executes commands associated with the user selecting that key. For example, the device may highlight the key, enter the associated character into an email or text message, execute a particular function or command, or take any other appropriate action.

In accordance with FIG. 4, Table 1 shows an example mapping of touch duration to user behavior and weighting. As shown, if the touch duration is less than 100 milliseconds, the user is considered to by typing quickly which can result in error where the user's finger slides across the screen. In that case, the target touch point is weighted towards the touch down location. If the touch duration is between 100 milliseconds and 250 milliseconds the user is considered to be typing at a moderate pace and the target touch point is weighted towards the midpoint between the touch down and touch up events. If the touch duration is greater than 250 milliseconds, the user is considered to be typing deliberately and the target touch point is weighted towards the touch up location.

TABLE 1

| Touch Duration | Behavior | Weighting |
|---|---|---|
| Touch Duration <100 ms | Typing quickly | Touch Down Event Location |
| 100 ms <= Touch Duration <= 250 ms | Typing at Moderate Pace | Midpoint Between Touch Down and Touch Up Events |
| Touch Duration >250 ms | Typing Deliberately | Touch Up Event Location |

Although FIG. 4 shows an implementation of the present system where user behavior is characterized based upon classification of the detected touch duration into one of three ranges (less than time_1, between time_1 and time_2, and greater than time_2), in other implementations of the present system, different numbers of classifications can be established using different time ranges. Additionally, the various weighting values that are used to determine a position of the user's target touch point can be selected in accordance with any appropriate system requirements.

In some implementations, the weighting applied to the target touch point can be absolute. For example, within some time ranges, a weighting may allocate the target touch point to a well-defined location, such as the touch down event location, the touch up event location, or a mid-point between the two. The mid-point may lie on a straight line formed between the touch-down event location and the touch up event location or along a touch path detected between the two. Alternatively, the weighting may be relative. For example, if the user exhibits a particular behavior, the target touch point may be positioned 25% of the way from the touch down event location to the touch up event location. Furthermore, in devices where a preliminary guess as to the target touch point is made before characterizing the user behavior, the weighting can be used to adjust the position of that preliminary guess.

Figure 5A:
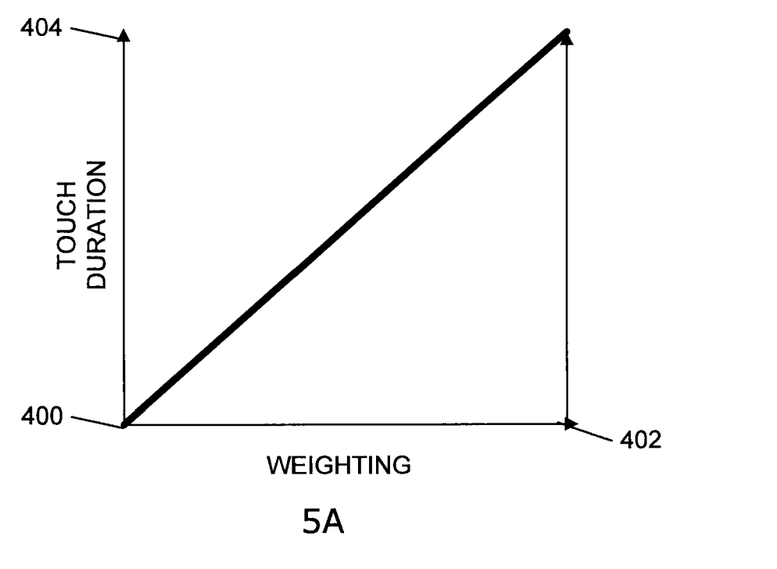
FIGS. 5A-5C illustrate several weighting algorithms for use in the present system.
Figure 5B:
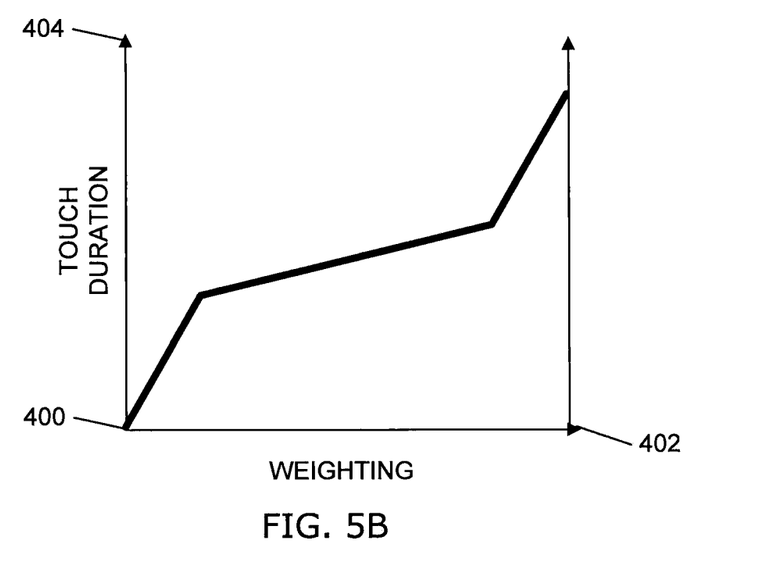
Figure 5C:
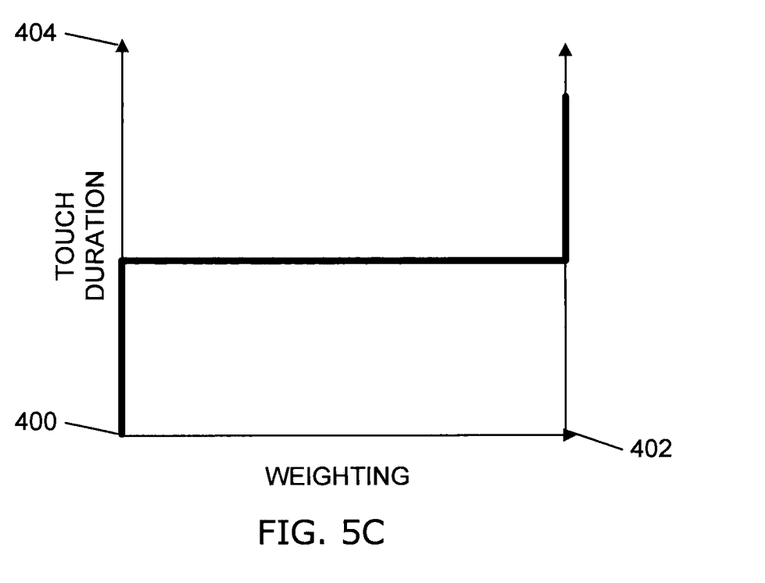

FIGS. 5A-5C illustrate several weighting algorithms for use in the present system. In each of FIGS. 5A-5C, the x-axis reflects a particular weighting to be applied to the position of the target touch point. Position 400 on the x-axis indicates the target touch point being weighted to the touch down event location. Position 402 on the x-axis indicates the target touch point being weighted to the touch up event location. The y-axis represents a touch duration. Position 400 on the y-axis indicates a minimal touch duration, while position 404 on the y-axis represents a maximum touch duration for which a corresponding weighting is defined.

In FIG. 5A the weighting algorithm is linear. If the touch duration is at a minimum threshold (i.e., at point 400 on the y-axis), then the target touch point is located at the touch down event location (i.e., at point 400 on the x-axis). At the other extreme, if the touch duration meets a maximum threshold (i.e., at point 404 on the y-axis), then the target touch point is located at the touch up event location (i.e., at point 402 on the x-axis). For touch durations greater than the maximum threshold, a default device behavior can be defined. For touch durations that fall between the minimum and maximum thresholds, as the touch duration increases, the weighting of the target touch point moves from the touch down event towards the touch up event.

In FIG. 5B, the weighting algorithm is non-linear and is configured to bias target touch points towards either the touch down event location or the touch up event location, and minimize the likelihood of the target touch point being weighted towards a position between the touch down event location and the touch up event location.

In FIG. 5C, the weighting algorithm is a step-wise function the results in the target touch point being located at either the touch down even location or the touch up event location, and not between the two. If the touch duration is below a predetermined threshold, the target touch point will always be located at the touch down event location (e.g., position 400 on the x-axis). If the touch duration is greater than a predetermined threshold, the target touch point will always be located at the touch up event location.

FIG. 6 is a flowchart showing an alternative method of the present system, wherein a touch path distance threshold is used to further determine the position of the target touch point.

In step 300, the device detects a touch down event and stores a location of the touch down event. The device may also store a time stamp for the touch down event (or, alternatively, starts a timers that runs until a corresponding touch up event is detected).

In step 302, the device detects a corresponding touch up event. Again, the device stores the location of the touch up event and a time of the touch up event. In implementations where the device started a timer in step 300, the device stops the timer.

Device 100 then analyzes the touch down event and the touch up event to determine the touch path length in step 304. In implementations where device 100 records a touch path (see, for example, touch path 254 of FIG. 3A), either as a continuous line or a number of intermediary points, the touch path length is the length of the detected touch path. Alternatively, in other implementations, device 100 defines a straight line (e.g., line 256 on FIG. 3B) between the touch down event location and the touch up event location, and defines the touch path length as the length of that line.

If the touch path length is less than a predetermined threshold (in one implementation the threshold is between 5 millimeters and 10 millimeters) in step 306, the device characterizes the user behavior based upon the touch down event and touch up event data in step 308. For example, the device may determine a duration of the touch event by comparing the time of the touch down event (stored in step 300) and the time of the touch up event (stored in step 302). Alternatively, in implementations where device 100 utilized a timer, device 100 reads the value of the timer. The duration can then be used to characterize behavior.

Based upon the characterized user behavior, a corresponding weighting is applied to the position of the target touch point in step 310. The device can then execute a command or function associated with the weighted touch point. Steps 308 and 310 may be implemented using any appropriate combination of touch duration thresholds and corresponding weightings. For example, steps 308 and 310 of FIG. 6 may be implemented in accordance with steps, 208, 210, 214, 216, 220 and 222 of FIG. 4.

If, however, the touch path length was greater than the predetermined threshold in step 306, the method weights the target touch point toward the touch up event location in step 312. Using the method illustrated in FIG. 6, therefore, if a user were to miss their target touch point, but drag their finger towards the target touch point as a correction, even if they do so quickly, the present method would detect that they have dragged their finger some distance and determine that the touch up event location is the target touch point.

FIG. 7 is a flowchart illustrating an implementation of the present system. In step 500, a touch down event is detected. Step 500 includes storing a position of the touch down event and starting a timer. In step 502 a touch up event is detected. Step 502 includes storing a position of the touch up event and stopping the timer to establish a touch duration.

In step 504 user behavior is characterized based upon the touch up and touch down events, as described above. In step 506 a weighting is applied to a target touch point based upon the determined user behavior.

While the present disclosure is described in the context of a portable electronic device, the concepts herein may be applied to stationary and/or fixed touch screen displays. Generally, a portable electronic device and method of identifying a user's target touch point on a portable device are disclosed that provide improved usability. By analyzing user behavior to determine the target touch point, the touch-sensitive display is more easily utilized by a user.

The present disclosure may be embodied in other specific forms without departing from its essential characteristics. The described embodiments are to be considered in all respects only as illustrative and not restrictive. The scope of the disclosure is, therefore, indicated by the appended claims rather than by the foregoing description. All changes that come within the meaning and range of equivalency of the claims are to be embraced within their scope.

To apprise the public of the scope of this disclosure, the following claims are made:

What is claimed is:

1. A method of correcting a location of a target touch point on a touch screen, comprising:
   detecting a touch down event at a first time and a first location on the touch screen;
   detecting a touch up event at a second time and a second location on the touch screen;
   calculating a difference between the second time and the first time to identify a touch duration; and
   determining the target touch point using the touch down event, the touch up event, and the touch duration, by:
      when the touch duration is less than a first predetermined threshold, weighting the target touch point towards the touch down event location,
      when the touch duration is greater than or equal to the first predetermined threshold and less than or equal to a second predetermined threshold, weighting the target touch point towards a midpoint between the touch down event location and the touch up event location, and
      when the touch duration is greater than the second predetermined threshold, weighting the target touch point towards the touch up event location, whereby the weighting of the target touch point is done to more accurately approximate an intended touch point of the user.

2. The method of claim 1, wherein the first predetermined threshold is approximately 100 milliseconds and the second predetermined threshold is approximately 250 milliseconds.

3. The method of claim 1, including, when a distance between the touch down event and the touch up event is greater than a predetermined threshold distance, determining that the position of the touch up event is the target touch point.

4. The method of claim 3, wherein the predetermined threshold distance is greater than 5 millimeters.

5. The method of claim 1, including:
   recording a touch path between the touch down event location and the touch up event location; and
   wherein the target touch point is located on the touch path.

6. The method of claim 1, wherein:
   weighting the target touch point towards the touch down even location includes determining the target touch point is located at the touch down event location;
   weighting the target touch point towards the midpoint between the touch down event location and the touch up event location includes determining the target touch point is located at the midpoint between the touch down event location and the touch up event location; and
   weighting the target touch point towards the touch up event location includes determining the target touch point is located at the touch up event location.

7. A user equipment, comprising:
   a touch screen;
   a sensor-coupled to the touch screen and configured to detect a touch event on the touch screen; and
   a processor coupled to the sensor and in communication with a memory, the memory storing instructions which, when executed by the processor cause the processor to:
      detect a touch down event at a first time and a first location on the touch screen;
      detect a touch up event at a second time and a second location on the touch screen;
      calculate a difference between the second time and the first time to identify a touch duration; and
      determine the target touch point using the touch down event, the touch up event, and the touch duration, by:
         when the touch duration is less than a first predetermined threshold, weighting the target touch point towards the touch down event location,
         when the touch duration is greater than or equal to the first predetermined threshold and less than or equal to a second predetermined threshold, weighting the target touch point towards a midpoint between the touch down event location and the touch up event location, and
         when the touch duration is greater than the second predetermined threshold, weighting the target touch point towards the touch up event location, whereby the weighting of the target touch point is done to more accurately approximate an intended touch point of the user.

8. A non-transitory computer readable medium having stored instructions executed by a processor of a portable electronic device and causing the portable electronic device to implement the method of:
   detecting a touch down event at a first time and a first location on the touch screen;
   detecting a touch up event at a second time and a second location on the touch screen;
   calculating a difference between the second time and the first time to identify a touch duration; and
   determining the target touch point using the touch down event, the touch up event, and the touch duration, by:
      when the touch duration is less than a first predetermined threshold, weighting the target touch point towards the touch down event location, when the touch duration is greater than or equal to the first predetermined threshold and less than or equal to a second predetermined threshold, weighting the target touch point towards a midpoint between the touch down event location and the touch up event location, and when the touch duration is greater than the second predetermined threshold, weighting the target touch point towards the touch up event location, whereby the weighting of the target touch point is done to more accurately approximate an intended touch point of the user.

* * * * *